United States Patent [19]

Häring

[11] Patent Number: 4,635,387

[45] Date of Patent: Jan. 13, 1987

[54] SNOWPLOW BLADE WITH SPRING-LOADED EDGE FLAPS

[76] Inventor: Theodor Häring, Industriestrasse 4, 7891 Dettighofen, Fed. Rep. of Germany

[21] Appl. No.: 621,514

[22] Filed: Jun. 18, 1984

[30] Foreign Application Priority Data

Jun. 24, 1983 [EP] European Pat. Off. ........ 83106186.6

[51] Int. Cl.[4] ............................................. E01H 5/04
[52] U.S. Cl. .................................... 37/232; 172/705; 172/816
[58] Field of Search ............... 37/232, 233; 172/701.1, 172/705, 816

[56] References Cited

U.S. PATENT DOCUMENTS

| 2,055,291 | 9/1936 | Henry | 37/233 |
| 3,158,944 | 12/1964 | Rehberg et al. | 172/816 |
| 3,429,059 | 2/1969 | Reissinger | 37/233 |
| 3,760,882 | 9/1973 | Geurts | 172/705 X |
| 4,074,896 | 2/1978 | Eftefield | 172/816 X |

FOREIGN PATENT DOCUMENTS 1074114 10/1954 France ................. 172/816

Primary Examiner—Edgar S. Burr
Assistant Examiner—Moshe I. Cohen
Attorney, Agent, or Firm—George E. Kersey

[57] ABSTRACT

A snowplow with a blade having a lower edge to which several spring flaps are hingeably linked. Reset springs retain the spring flaps in their working positions, and return the spring flaps to their working positions after having been deflected. To prevent overload of the reset springs, each is supported to be movable in the same sense as the pivoting direction of the associated spring flap, so that the increase in spring force, while the spring flap is being deflected, is at least partially counteracted.

17 Claims, 4 Drawing Figures

Fig.1
Fig.2
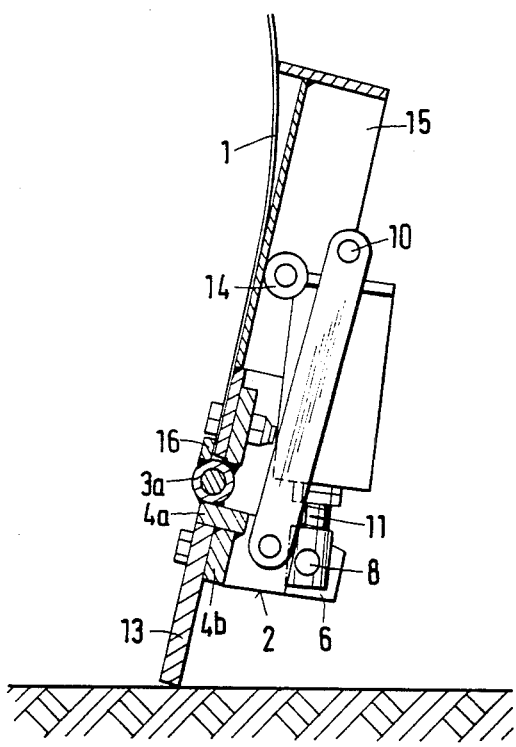
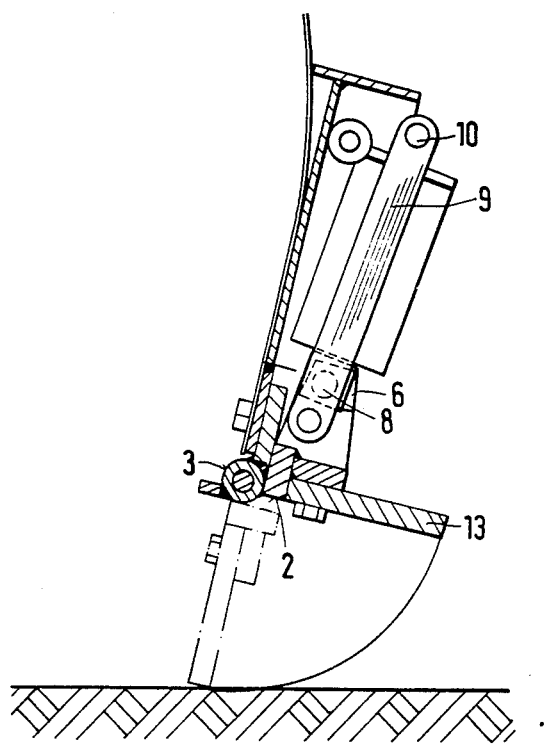

SNOWPLOW BLADE WITH SPRING-LOADED EDGE FLAPS

BACKGROUND OF THE INVENTION

The invention relates to a snowplow blade having spring flaps hinged to a bottom edge of the blade. The flaps are retained in their working positions by pre-tensioned reset springs, and wear bars are fastened to the flaps.

With known spring-flap snowplows, the spring flaps are coupled closely together at the plowblade. A torsion reset spring, supported against the backside of the plowblade, holds each spring flap in its working position. When the spring flaps encounter obstacles in the road surface, the individual spring flaps can deflect against the torsion spring by a clockwise swinging motion. This increasingly tensions the reset spring. Considering that the reset spring is already under considerable pre-tension in the normal working position of the spring flap, it is apparent that the reset springs often rupture after a short operating interval as a result of the shock-like deflecting motions of the spring flaps. Even if the springs do not rupture, there is a reduction in their pre-tensioning.

Attempts have been made to compensate this disadvantage by proper dimensioning of the reset springs. In so doing, a compromise has been necessary. The reset spring has to be strong enough to retain its associated spring flap in its working position with sufficient pre-tension. On the other hand, excessive deformation of the spring must be avoided when the spring flap is in its retracted state. With the torsion springs that are customarily used, this compromise could be achieved only by specially fabricated springs with dimensions closely matched to the spring material. Even so, the springs are frequently destroyed prematurely. Moreover, the force of the reset springs, especially with heavy wet snow, often is not sufficient to return the retracted spring flaps to their working positions.

Additionally, known spring-flap snowplows have the further disadvantage, due to the arrangement of the pivoting axis just behind the plowblade, that there is a considerable undercut of the path of motion of the scraping edges of the spring flaps below the surface being scraped.

By contrast, the present invention aims to improve the action of the reset springs in connection with spring-flap snowplows, especially to avoid an overloading of the reset springs, and further to reduce the undercut of the spring flaps to a neglibible value.

SUMMARY OF THE INVENTION

According to the invention, the foregoing objects are achieved for a snowplow as follows: The reset spring is supported to move in the same sense as the pivoting direction of the spring flap, in a fashion such that the increase of spring force during deflection of the spring flap is at least partially counteracted.

The invention further provides a deflection motion on the part of the reset spring. As a result, the increasing compression, due to the turn-around of the spring flap, can be limited so that overloads are avoided, both during continuous operation and even taking into account considerable shock loading on the spring flap. Consequently, the life of the reset springs can be considerably increased. By providing a suitable displacement path for the reset spring, the indiviual dimensioning of each reset spring is no longer critical. Commercially available springs, therefore, can be used as reset springs, with compression springs being particularly suitable. These springs are supported against a stop that yields during compression.

A particularly suitable embodiment of the invention provides a reset spring that is formed by a large number of saucer segments contained in a housing. Further, the housing is made adjustable so as to counteract the compression of the saucer segments. By such a constraint on the spring housing, the reset force of the saucer springs can be adjusted in a prescribed fashion over the entire pivoting path of the spring flap. In addition, to better achieve this objective, the pre-tension of the saucer springs can be made variable.

An especially advantageous embodiment of the invention includes a housing, which is mounted on coupling supports and is pivotable about a first axis at the backside of the spring flaps; and a tappet that is likewise supported so as to be pivotable about a second axis at the backside of the the spring flap where the tappet acts on the saucer springs. In this arrangement, the first axis is closer to the plow axis than the second axis.

As a result, a large displacement on the part of the spring flap can be converted into a relatively short path for the reset spring. Due to the spatial arrangement of the two axes, there is obtained a constant pressure of the housing against the backside of the plowblade. Consequently, additional fasteners are not needed. Instead, it is sufficient for the housing or the supports to be guided between lateral rails and for the housing to be supported slidingly or by rollers at the backside of the plowblade.

In addition, the housing can be connected with the backside of the plowblade by a steering connection. Such a variant is especially desirable if the particular geometry described above for the two axes can not be realized. The latter feature further makes it possible to displace the hinge axis, for the connection of the spring flap with the plowblade, approximately into the plane of the plowblade. Accordingly, the undercut of the spring flaps can be reduced to a small value corresponding to the slant of the plowblade. This facilitates the resetting of the spring flaps from their deflected position into their working position, which is in the clockwise sense.

DESCRIPTION OF THE DRAWINGS

An illustrative embodiment of the invention is explained below in more detail in terms of the drawings, in which:

FIG. 1 is a vertical section through a snowplow blade in the region of its spring flap, which is shown in its working position;

FIG. 2 is a view similar to that of FIG. 1, with the spring flap completely retracted;

DETAILED DESCRIPTION

Figure 4:
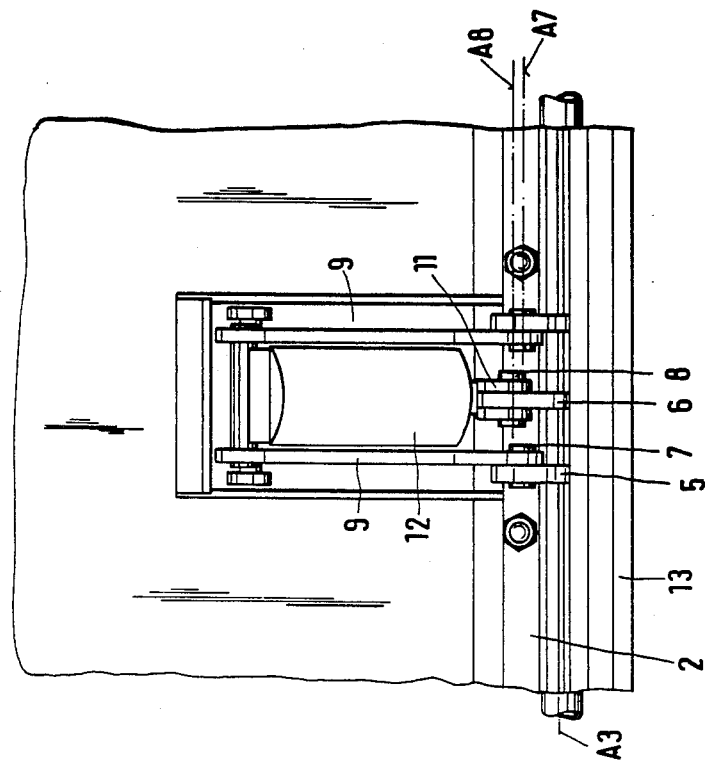
FIG. 4 is a view similar to that of FIG. 3, with the spring flap completely retracted.

With reference to FIGS. 1 through 4, a spring-flap showplow includes a plowblade (1) connected to a bulldozer-type vehicle by a coupling device, and spring flaps (2) that are joined to the blade by a hinge (3). The flaps are pivotably fastened and have wearbars (13).

In the usual snowplow, two to four spring flaps preferably are disposed at the lower edge of the plowblade. The hinge (3) has a structure corresponding to the well-known piano hinge. As a result, the tube jointing sleeves (3a, 3b) (FIG. 3) are seated on the hinge axis and are welded alternately to the plowblade (1) and the spring flaps (2). Forward motion of the spring flaps (2) is limited by a stop bar (16).

Figure 3:
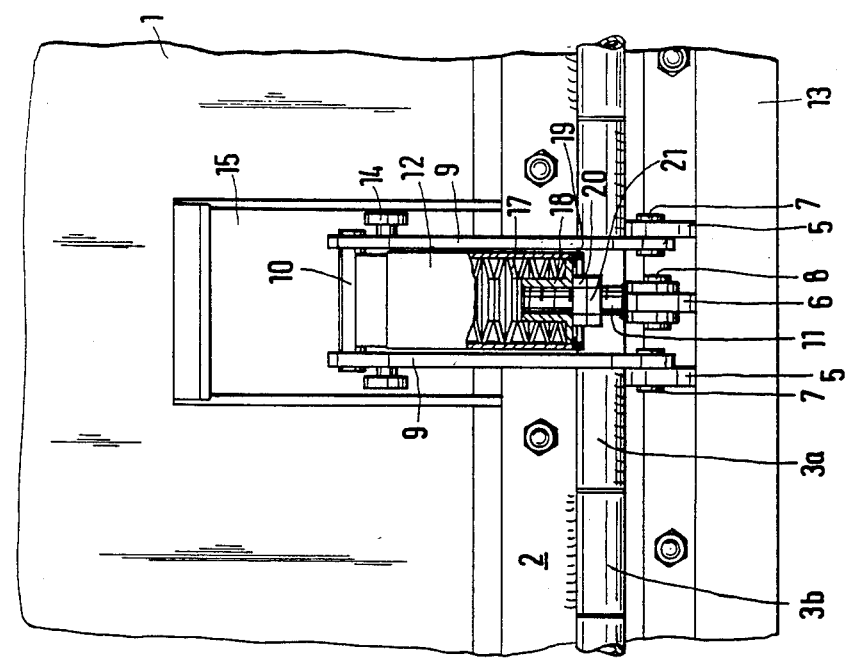
FIG. 3 is a view of the backside section of a snowplow with its spring flap in its working position.

As shown in FIGS. 1 and 2, one of the tube jointing sleeves (3a) is welded to two flatirons (4a, 4b) and the stop bar (16). The two flatirons (4a, 4b) form a seat for the wearbar (13), which is screwed to the flatiron (4b), so that the wearbar can be replaced easily. Plates (5, 6) are welded to the flatirons (4a, 4b), perpendicular to the longitudnal direction of the flatirons (FIG. 3). These plates act as long supporting blocks (5, 6) in which are seated bearing pins (7, 8). The axes of the pins (7, 8) run parallel to the axis of hinge (3).

Pins (7), which are mounted in the shorter supporting blocks (5) penetrate the lateral supports (9) which form a yoke together with an upper transverse part (10).

A tappet (11) is seated on each of the pins (8), which are mounted in the longer supporting blocks (6). The tappet (11) acts on a reset spring in a housing (12). In a preferred design, the reset spring is realized by several saucer elements (17), which are included within the spring housing (12).

The tappet (11) bears against the saucer springs (17) by way of a pressure plate (18) (FIG. 3) that is guided within the interior of the housing (12). The tappet (11) thus presses the saucer elements (17) together. The required pre-tension of the reset spring can be established by a safety ring (19), which is situated in a ring groove cut into the interior of the housing.

The amount of pre-tension also can be varied by changing the length of the tappet (11). For this purpose, the tappet (11) has an outer thread on which a pressure plate (18) is placed. The tappet (11) is secured by a nut (20) with counter nut (21).

The spring housing (12) is fastened at the transverse part (10) of the yoke. The guidance of the spring housing (12) can be achieved in a variety of ways. Illustratively, rollers (14) are fastened to the housing below the lateral supports (9) of the yoke. These rollers (14) run in a U-shaped reinforcement rail (15).

As shown in FIG. 3 the tube jointing sleeve (3b) of the hinge (3) is connected with the plowblade (1); and the tube jointing sleeves (3a) are connected with the spring flap (13).

To explain the mode of operation, the essential axes for functioning are identified in FIG. 4. A3 identifies the axis of the hinge (3); A7 is the axis of the pins (7); and A8 is the rotational axis of the pin (8).

As can be seen from the drawings (FIG. 4), the axis (A7) of the coupling of the supports (9) of the yoke is closer to the hinge axis (A3) than is the axis (A8) for the coupling of the tappet (11). When traversing an obstacle, the spring flap (2) is swung rearwardly and upwardly. At the same time, the yoke is forcibly moved upwardly a corresponding amount, as is the tappet. However, since the coupling axis (A8) is farther removed from the rotational axis (A3) of the hinge (3) than is the pin axis (A7), the tappet (11) is pushed into the spring housing (12). This compresses the reset spring.

The total motion of the tappet (11) consequently corresponds to the translational motion of the yoke plus the spring path.

In this fashion, a relatively large motion can be achieved within the existing space, by using a reset spring with a high spring force and a short spring path.

What is claimed is:

1. A snowplow having a blade (1) at least two spring flaps (2) being pivoted at the bottom of the blade by hinges, each having a hinge axis disposed approximately in the plane of said blade each spring flap having a wearbar (13) depending therefrom and being retained in its working position by a pre-tensioned reset spring (17), a U-shaped reinforcement rail mounted on the back of said blade, said reset spring (17) being compressive and included within a spring housing (12); and means responsive to the pivoting of said spring flaps to simultaneously compress said spring and displace said spring housing and said spring along said U-shaped reinforcement rail said spring housing (12) being guided to be moveable longitudinally along said reinforcement rail.

2. A snowplow according to claim 1, characterized in that a tappet (11) extends completely through said reset spring (17) along its axis in the middle range thereof; the upper end of said tappet (11) is provided with a stop having an undersurface which abuts the top end of said reset spring (17); the lower end of said reset spring (17) abuts upon the bottom of said spring housing which is moveable in the same sense as the pivoting direction of said spring flaps (2).

3. A snowplow according to claim 1, characterized in that the reset spring is formed by a plurality of saucer elements (17) included within a spring housing (12) that is adjustably guided.

4. A snowplow according to claim 2, characterized in that the reset spring is formed by a plurality of saucer elements (17) included within a spring housing (12) that is adjustably guided.

5. A snowplow according to claim 3, characterized in that the spring housing (12) is mounted on supports (9) which are coupled thereto, and are pivotable about a first axis (A7) at the backside of the spring flap (2); a tappet (11) is likewise disposed at the backside of the spring flap (2) and supported so as to be pivotable about a second axis (A8); the tappet (11) acts on the saucer springs (17); and the first axis (A7) is closer to the hinge axis (3) than is the second axis (A8).

6. A snowplow according to claim 3, characterized in that the spring housing (12) and its supports (9) are connected between lateral rails of said U-shaped rail.

7. A snowplow according to claim 4, characterized in that the spring housing (12) and its supports (9) are connected between lateral rails of said U-shaped rail.

8. A snowplow according to claim 3, characterized in that the spring housing (12) is supported slidingly by rollers (14) at the backside of the plowblade (1).

9. A snowplow according to claim 4, characterized in that the spring housing (12) is supported slidingly by rollers (14) at the backside of the plowblade (1).

10. A snowplow according to claim 5, characterized in that the spring housing (12) is supported slidingly by rollers (14) at the backside of the plowblade (1).

11. A snowplow according to claim 3, characterized in that the spring housing (12) is connected to the backside of the plowblade (1) through a steering linkage.

12. A snowplow according to claim 4, characterized in that the spring housing (12) is connected to the backside of the plowblade (1) through a steering linkage.

13. A snowplow according to claim 5, characterized in that the spring housing (12) is connected to the backside of the plowblade (1) through a steering linkage.

14. A snowplow according to claim 6, characterized in that the spring housing (12) is connected to the backside of the plowblade (1) through a steering linkage.

15. A snowplow according to claim 4, characterized in that the length of the tappet (11) for supporting the saucer springs (17) is adjustable.

16. A snowplow according to claim 5, characterized in that the length of the tappet (11) for supporting the saucer springs (17) is adjustable.

17. A snowplow according to claim 7, characterized in that the length of the tappet (11) for supporting the saucer springs (17) is adjustable.

* * * * *